(12) United States Patent
Bancalari et al.

(10) Patent No.: US 7,721,547 B2
(45) Date of Patent: May 25, 2010

(54) COMBUSTION TRANSITION DUCT PROVIDING STAGE 1 TANGENTIAL TURNING FOR TURBINE ENGINES

(75) Inventors: Eduardo Bancalari, Orlando, FL (US);
Jody Wilson, Winter Springs, FL (US);
David A. Little, Chuluota, FL (US);
Joseph Fadok, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 139 days.

(21) Appl. No.: 11/167,464

(22) Filed: Jun. 27, 2005

(65) Prior Publication Data

US 2007/0017225 A1    Jan. 25, 2007

(51) Int. Cl.
*F02C 1/00* (2006.01)
*F02G 3/00* (2006.01)

(52) U.S. Cl. ...................... 60/752; 415/199.5
(58) Field of Classification Search ................. 60/752, 60/39.37, 269; 415/199.5, 206, 203
See application file for complete search history.

(56) References Cited

U.S. PATENT DOCUMENTS

| 972,642 | A | * | 10/1910 | Reed | ............................ | 60/793 |
|---|---|---|---|---|---|---|
| 2,567,079 | A | | 9/1951 | Owner et al. | | |
| 2,851,853 | A | * | 9/1958 | Quick | .......................... | 60/262 |
| 3,238,718 | A | * | 3/1966 | Hill | ............................ | 60/39.37 |
| 3,609,968 | A | | 10/1971 | Mierley, Sr. et al. | | |
| 3,657,882 | A | | 4/1972 | Hugoson | | |
| 3,657,884 | A | | 4/1972 | Hugoson | | |
| 3,750,398 | A | | 8/1973 | Adelizzi et al. | | |
| 3,965,066 | A | | 6/1976 | Sterman et al. | | |
| 4,016,718 | A | | 4/1977 | Lauck | | |
| 4,060,337 | A | | 11/1977 | Bell | | |
| 4,422,288 | A | | 12/1983 | Steber | | |
| 4,640,092 | A | | 2/1987 | Coburn et al. | | |
| 5,016,818 | A | | 5/1991 | Nash et al. | | |
| 5,337,583 | A | | 8/1994 | Giles et al. | | |
| 5,400,586 | A | | 3/1995 | Bagepalli et al. | | |
| 5,414,999 | A | | 5/1995 | Barnes | | |
| 5,572,863 | A | | 11/1996 | Wrightham et al. | | |
| 5,664,415 | A | | 9/1997 | Terrier | | |

(Continued)

FOREIGN PATENT DOCUMENTS

EP    0 718 468 A1    6/1996

(Continued)

OTHER PUBLICATIONS

Office Action dated Jun. 18, 2008 in U.S. Appl. No. 11/249,790.

(Continued)

*Primary Examiner*—Michael Cuff
*Assistant Examiner*—Andrew Nguyen (57) ABSTRACT

A transition duct for routing a gas flow from a combustor to the first stage of a turbine section in a combustion turbine engine has an internal passage from an inlet to an outlet that is offset from the inlet in the longitudinal, radial and tangential directions. The offset outlet and the curved internal passage discharge the gas flow toward the first stage blade array at an angle in the tangential direction relative to the longitudinal direction. This angled discharge can be presented directly to the blades, thus avoiding the need for first stage vanes and the associated costs and complexity.

18 Claims, 7 Drawing Sheets

U.S. PATENT DOCUMENTS

| | | | |
|---|---|---|---|
| 5,706,646 A | | 1/1998 | Wilde et al. |
| 5,761,898 A | * | 6/1998 | Barnes et al. ................... 60/799 |
| 5,946,902 A | | 9/1999 | Schuetz et al. |
| 6,021,637 A | | 2/2000 | Scavo |
| 6,120,249 A | | 9/2000 | Hultgren et al. |
| 6,148,604 A | | 11/2000 | Salt et al. |
| 6,442,946 B1 | | 9/2002 | Kraft et al. |
| 6,644,032 B1 | | 11/2003 | Jorgensen et al. |
| 6,662,567 B1 | | 12/2003 | Jorgensen |
| 6,823,676 B2 | | 11/2004 | Conete et al. |
| 7,311,790 B2 | * | 12/2007 | Morrison et al. ......... 156/89.11 |
| 2002/0112483 A1 | | 8/2002 | Kondo et al. |
| 2003/0154719 A1 | | 8/2003 | Nishi et al. |
| 2004/0214051 A1 | * | 10/2004 | Morrison et al. ............ 428/701 |
| 2006/0242965 A1 | * | 11/2006 | Shi et al. ...................... 60/796 |

FOREIGN PATENT DOCUMENTS

| | | |
|---|---|---|
| JP | 58208519 A | 12/1983 |
| JP | 01-155120 | 6/1989 |

OTHER PUBLICATIONS

Final Office Action dated Nov. 6, 2008, in U.S. Appl. No. 11/249,790.
Amendment dated Sep. 17, 2008, in U.S. Appl. No. 11/249,790.
Examiner Interview Summary dated Jan. 26, 2009 in U.S. Appl. No. 11/249,790.
Amendment dated Feb. 3, 2009 in U.S. Appl. No. 11/249,790.
Advisory Action dated Mar. 3, 2009 in U.S. Appl. No. 11/249,790.
RCE and associated papers dated Apr. 1, 2009 in U.S. Appl. No. 11/249,790.
Applicant Interview Summary dated Apr. 9, 2009 in U.S. Appl. No. 11/249,790.
Notice of Allowance and associated papers dated May 4, 2009 in U.S. Appl. No. 11/249,790.

* cited by examiner

COMBUSTION TRANSITION DUCT PROVIDING STAGE 1 TANGENTIAL TURNING FOR TURBINE ENGINES

FIELD OF THE INVENTION

The invention relates in general to combustion turbine engines and, more specifically, to transition ducts for routing gas flow from combustors to the turbine section of a combustion turbine engine.

BACKGROUND OF THE INVENTION

Figure 1:
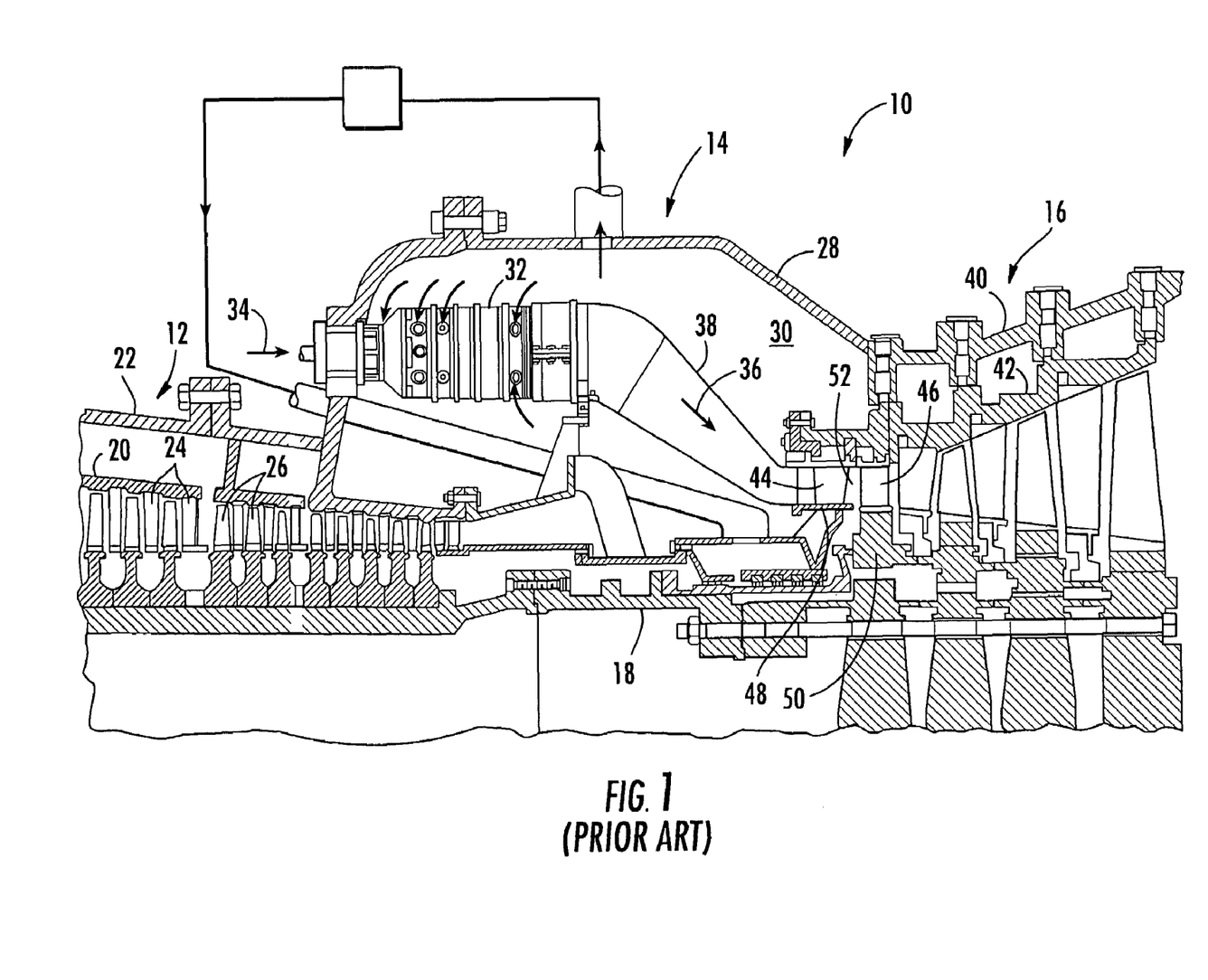
FIG. 1 is a cross-sectional view of a portion of a prior turbine engine.

Referring to FIG. 1, there is shown a cross-section through a portion of a combustion turbine 10. The major components of the turbine are a compressor section 12, a combustion section 14 and a turbine section 16. A rotor assembly 18 is centrally located and extends through the three sections. The compressor section 12 can include cylinders 20, 22 that enclose alternating rows of stationary vanes 24 and rotating blades 26. The stationary vanes 24 can be affixed to the cylinder 20 while the rotating blades 26 can be mounted to the rotor assembly 18 for rotation with the rotor assembly 18.

The combustion section 14 can include a shell 28 that forms a chamber 30. Multiple combustors, for example, sixteen combustors (only one combustor 32 of which is shown) can be contained within the combustion section chamber 30 and distributed around a circle in an annular pattern. Fuel 34, which may be in liquid or gaseous form—such as oil or gas—can enter each combustor 32 and be combined with compressed air introduced into the combustor 32 from the chamber 30, as indicated by the unnumbered arrows surrounding the combustor 32. The combined fuel/air mixture can be burned in the combustor 32 and the resulting hot, compressed gas flow 36 can be exhausted to a transition duct 38 attached to the combustor 32 for routing to the turbine section 16.

The turbine section 16 can include a cylindrical housing 40, including an inner cylinder 42, can enclose rows of stationary vanes and rotating blades, including vanes 44 and blades 46. The stationary vanes 44 can be affixed to the inner cylinder 42 and the rotating blades 46 can be affixed to discs that form parts of the rotor assembly 18 in the region of the turbine section 16. The first row of vanes 44 and the first row of blades 46 near the entry of the turbine section 16 are generally referred to as the first stage vanes and the first stage blades, respectively.

Encircling the rotor assembly 18 in the turbine section 16 can be a series of vane platforms 48, which together with rotor discs 50, collectively define an inner boundary for a gas flow path 52 through the first stage of the turbine section 16. Each transition duct 38 in the combustion section 14 can be mounted to the turbine section housing 40 and the vane platforms 48 to discharge the gas flow 30 towards the first stage vanes 44 and first stage blades 46.

In operation, the compressor section 12 receives air through an intake (not shown) and compresses it. The compressed air enters the chamber 30 in the combustion section 14 and is distributed to each of the combustors 32. In each combustor 32, the fuel 34 and compressed air are mixed and burned. The hot, compressed gas flow 30 is then routed through the transition duct 38 to the turbine section 16. In the turbine section 16, the hot, compressed gas flow is turned by the vanes, such as the first stage vane 44, and rotates the blades, such as the first stage blade 52, which in turn drive the rotor assembly 18. The gas flow is then exhausted from the turbine section 16. The turbine system 10 can include additional exhaust structure (not shown) downstream of the turbine section 16. The power thus imparted to the rotor assembly 18 can be used not only to rotate the compressor section blades 26 but also to additionally rotate other machinery, such as an external electric generator or a fan for aircraft propulsion (not shown).

For a better understanding of the invention, a coordinate system can be applied to such a turbine system to assist in the description of the relative location of components in the system and movement within the system. The axis of rotation of the rotor assembly 18 extends longitudinally through the compressor section 12, the combustion section 14 and the turbine section 16 and defines a longitudinal direction. Viewed from the perspective of the general operational flow pattern through the various sections, the turbine components can be described as being located longitudinally upstream or downstream relative to each other. For example, the compressor section 12 is longitudinally upstream of the combustion section 14 and the turbine section 16 is longitudinally downstream of the combustion section 14.

The location of the various components away from the central rotor axis or other longitudinal axis can be described in a radial direction. Thus, for example, the blade 46 extends in a radial direction, or radially, from the rotor disc 50. Locations further away from a longitudinal axis, such as the central rotor axis, can be described as radially outward or outboard compared to closer locations that are radially inward or inboard.

The third coordinate direction—a circumferential direction—can describe the location of a particular component with reference to an imaginary circle around a longitudinal axis, such as the central axis of the rotor assembly 18. For example, looking longitudinally downstream at an array of turbine blades in a turbine engine, one would see each of the blades extending radially outwardly in several radial directions like hands on a clock. The "clock" position—also referred to as the angular position—of each blade describes its location in the circumferential direction. Thus, a blade in this example extending vertically from the rotor disc can be described as being located at the "12 o'clock" position in the circumferential direction while a blade extending to the right from the rotor disc can be described as being located at the "3 o'clock" position in the circumferential direction, and these two blades can be described as being spaced apart in the circumferential direction. Thus, the radial direction can describe the size of the reference circle and the circumferential direction can describe the angular location on the reference circle.

Generally, the longitudinal direction, the radial direction and the circumferential direction are orthogonal to each other. Also, direction does not necessarily connote positive or negative. For example, the longitudinal direction can be both upstream and downstream and need not coincide with the central axis of the rotor. The radial direction can be inward and outward, and is not limited to describing circular objects or arrays. The circumferential direction can be clockwise and counter-clockwise, and, like the radial direction, need not be limited to describing circular objects or arrays.

Further, depending on the context, the relevant position of two components relative to each other can be described with reference to just one of the coordinate directions. For example, the combustor 32 can be described as radially outboard of the blade 46 because the combustor 32 is located radially further away from the central axis of the rotor assembly 18 than the blade 46 is—even though the combustor 32 is not in the same longitudinal plane of the blade 44, and in fact, is longitudinally upstream of the blade 44 and may not be circumferentially aligned with a particular blade.

The coordinate system can also be referenced to describe movement. For example, gas flow 36 in the transition 38 is shown to flow in the direction of arrow 36. This gas flow 36 travels both longitudinally downstream from the combustor 32 to the turbine section 16 and radially inward from the combustor 32 to the first stage vanes 44 and blades 46.

In the context of describing movement, such as the flow of a gas, the circumferential direction can also be referred to as the tangential direction. When gas flows in the circumferential direction, a component of the flow direction is tangential to a point on the circular path. At any given point on the circle path, the circumferential flow can have a relatively larger tangential component and a relatively smaller radial component. Since the tangential component predominates, particularly for larger diameter paths, such as around vane and blade arrays in a turbine engine, a circumferential direction and tangential direction can be regarded as substantially the same.

Figure 2:
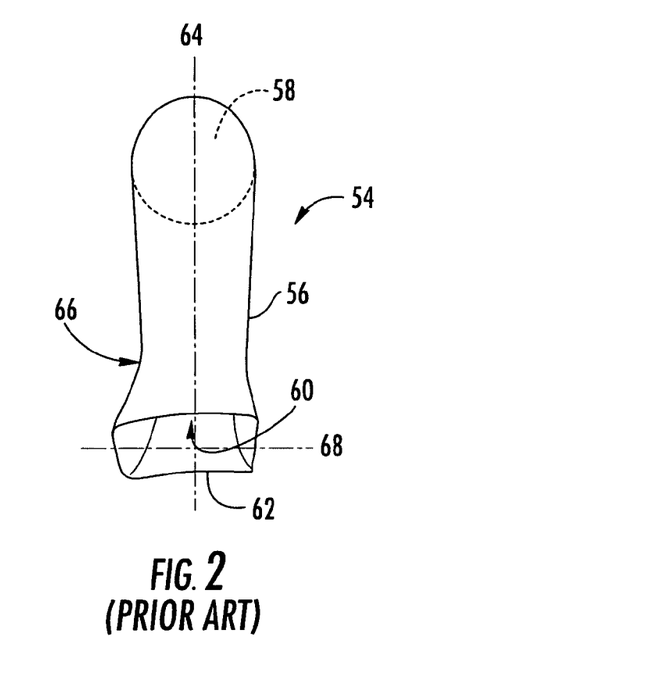
FIG. 2 is an upstream longitudinal view of a prior transition duct.

Bearing this coordinate system in mind and referring to FIG. 2, a transition duct 54 is shown alone as it would be seen when viewed from longitudinally downstream. This particular transition duct 54 is oriented in the 12 o'clock circumferential position and it should be understood that a turbine engine would have additional transition ducts, for example, a total of sixteen, spaced in an annular array.

The transition duct 54 can include a transition duct body 56 having an inlet 58 for receiving a gas flow exhausted by an associated combustor (not shown, but see FIG. 1). The transition duct body 56 can include an internal passage 60 from the inlet 58 to an outlet 62 from which the gas flow is discharged towards the turbine section (not shown). Because the combustor is radially outboard of the first stage of the turbine section (see FIG. 1), the transition duct 54 extends radially inwardly from its inlet 58 to its outlet 62. In FIG. 2, this radial direction is depicted by the axis 64. The transition duct 54 includes a longitudinal bend 66 near the outlet 62 to discharge the gas flow predominantly longitudinally. Because the gas flow in the transition duct 54 is redirected radially inwardly and then longitudinally, the transition duct 54 experiences substantial bending thrust in the radial direction 64. This radial thrust pushes the outlet region of the transition duct 54 radially outwardly (up in the plane of the page of the figure). To support the transition duct 54 against this bending thrust, the transition duct 54 can be radially supported by various braces (not shown) at its ends, as it well known in the art.

It can be seen that the outlet 62 and the inlet 58 are aligned along the circumferential or tangential direction, which is depicted by the axis 68. Thus, while the transition duct 54 routes the gas flow longitudinally downstream and radially inwardly, there is essentially no flow routing in the circumferential or tangential direction.

Figure 3:
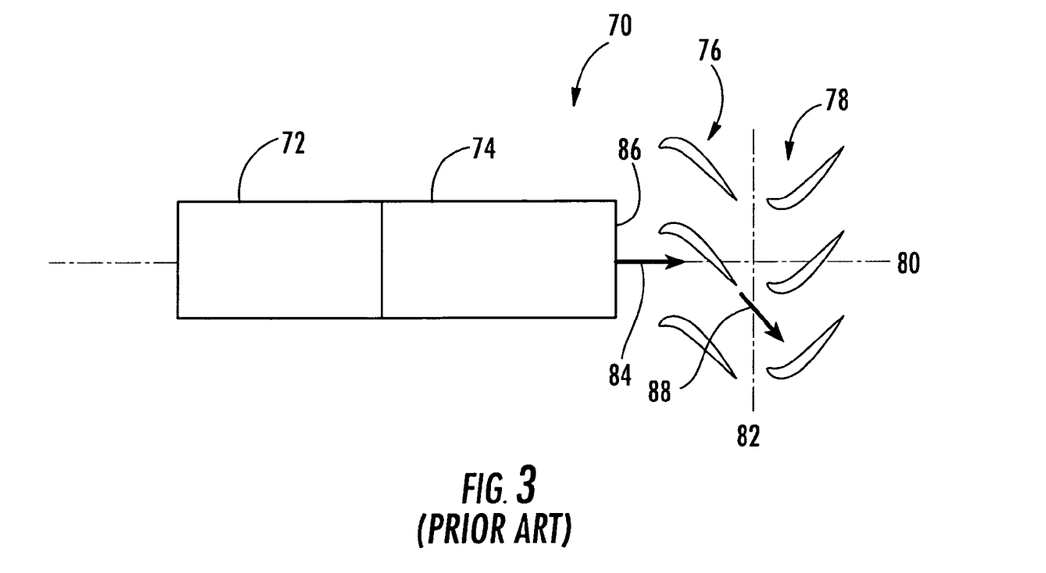
FIG. 3 is a schematic radial view of a combustor, transition duct and first stage vanes and blades of a prior turbine engine.

Reference is now made to FIG. 3, focusing on a turbine subsection 70 that includes a combustor 72, a transition duct 74 and first stage vanes 76 and blades 78. FIG. 3 shows a view from above of the combustor 72, the transition duct 74, a few first stage vanes 76 and a few first stage blades 78, illustrated schematically. It should be understood that in a turbine, there would be additional first stage vanes spaced apart circumferentially to form an annular array. Similarly, there would be additional first stage blades spaced apart circumferentially to form an annular array. These additional vanes and blades are not shown in FIG. 3 to facilitate illustration. This schematic illustration is also not intended to be to scale. A turbine system would typically also include additional combustors and transitions, but a single combustor 72 and transition 74 are shown schematically for purposes of illustration.

From this top view, the longitudinal direction can be noted by reference to the axis 80. The circumferential or tangential direction can be noted by reference to the axis 82. The radial direction is not illustrated because the radial direction lies into and out of the page of the figure, but would be generally orthogonal to the longitudinal direction and the radial direction.

Gas flow, such as hot, compressed gas with perhaps some limited liquid content, is exhausted from the combustor 72 and routed by the transition duct 74 to the first stage vanes 76 and blades 78. The gas flow as discharged from the exit or outlet 86 of the transition duct 74 generally travels downstream in the longitudinal direction, as indicated by the arrow 84. There may be some incidental, small-scale radial and circumferential flow components to the discharged gas flow due to edge conditions 86 at the outlet and other factors. However, such side flow should be regarded as relatively de minimis compared to the overall flow direction, which is predominantly longitudinal, particularly in the central region of the flow away from the edges.

As this longitudinal gas flow 84 discharges from the outlet 86 of the transition duct 74, the flow passes the first stage vanes 76. The function of the first stage vanes 76 is to accelerate and turn the predominantly longitudinal flow in the circumferential direction 82 so that the predominant flow direction of the gas flow leaving the trailing edges of vanes 76 is angled in the circumferential or tangential direction relative to the longitudinal direction as shown, for example, by the arrow 88. This turned flow 88 thus has a longitudinal component and a circumferential component. The flow angle can be substantial, in the range of 40 degrees to 85 degrees measured from the longitudinal axis 80. By accelerating and angling the gas flow in the circumferential direction 82 relative to the longitudinal direction 80, the resulting gas flow 88 more effectively imparts its energy to the first row blades 78, which in turn rotate the associated rotor assembly (not shown).

The use of first stage vanes to accelerate and turn the longitudinal gas flow in the circumferential direction present several challenges. The vanes and the associated vane support structure (see FIG. 1) must have high strength characteristics to withstand the forces generated in changing the direction of a extremely hot, high pressure gas flow over a substantial angle in a relatively short distance. The temperature of the gas flow and the heat generated by this turning process also require a vane cooling system. The forces and heat involved can crack and otherwise damage the vanes and associated support structure. To address these various requirements and operating conditions, the first stage vanes and the associated support structure and cooling systems have developed into a complex system that can be expensive to manufacture, install, and, in the event of damage, repair and replace.

Thus, there is a need to accelerate and tangentially turn a gas flow for presentation to a first stage blade array without the complications and related costs and damage risks associated with first stage vanes.

SUMMARY OF THE INVENTION

It is thus an object according aspects of the invention to provide a turbine subsystem that eliminates the need for first stage turbine section vanes.

It is another object according to aspects of the invention to provide a combustor transition duct that not only routes gas flow exhausted from a combustor to the first stage of a turbine section, but also discharges the gas flow at a tangential or circumferential angle that is appropriate for direct presentation to a first stage blade array, without turning by a first stage vane array.

These and other objects of the invention can be achieved by a transition duct having a transition duct body that includes an internal passage extending between an inlet and an outlet, wherein the outlet is offset from the inlet in three coordinate directions—the longitudinal direction, the radial direction and the tangential direction and the internal passage is curved to the offset outlet. With this construction, a gas flow discharges from the outlet at an angle between the longitudinal direction and the tangential direction when the transition duct body is located between a combustor and a first stage blade array to receive the gas flow from the combustor into the internal passage through the inlet and to discharge the gas flow toward the first stage blade array.

According to preferred aspects of the invention, the outlet region of the transition duct body surrounding the outlet can be elongated in the tangential direction. In particular, it can be rectangular in the tangential direction, and it can even be arcuate in the tangential direction. Similarly, the inlet region of the transition duct body surrounding the inlet can be generally round and the internal passage can transition from a generally round cross-sectional profile at the inlet to a generally tangentially elongated cross-sectional profile at the outlet. Additionally, the width of the internal passage in the tangential direction can decrease from the inlet toward the outlet, and optionally, the height of the internal passage in the radial direction decreases from the inlet toward the outlet.

The transition duct according to aspects of the invention can also be made at least partially from ceramic. The transition duct can be cooled by impingement cooling, effusion cooling, steam cooling or other cooling techniques.

According to aspects of the invention, a combustion turbine subsystem using the above mentioned transition duct can be incorporated into a combustion turbine engine. The subsystem can include a first stage blade array having a plurality of blades extending in a radial direction from a rotor assembly for rotation in a circumferential direction about an axis of the rotor assembly. The axis of the rotor assembly can define a longitudinal direction and the circumferential direction can include a tangential direction component. The turbine subsystem can further include a plurality of combustors located longitudinally upstream of the first stage blade array, with each of the combustors being located radially outboard of the first stage blade array, and each combustor exhausting a gas flow at least downstream towards the first stage blade array.

The subsystem also includes a plurality of transition duct bodies. Each transition duct body in the subsystem can have an internal passage extending between an inlet and an outlet, with each transition duct body being located between a respective combustor and the first stage blade array to receive the gas flow exhausted by the respective combustor into the internal passage through the inlet. The outlet of each transition duct can discharge the gas flow from the internal passage toward the first stage blade array. As mentioned previously, the outlet of each transition duct can be longitudinally, tangentially and radially offset from the inlet and the internal passage can be curved toward the offset outlet so that the gas flow discharges from the outlet at a discharge angle between the longitudinal direction and the tangential direction. The discharge angle is preferably between about 40 degrees and about 85 degrees relative to the longitudinal direction, and optionally, the gas flow discharges from the outlet substantially in a plane defined by the longitudinal direction and the tangential direction, that is, with little or no radial directional component.

The subsystem can further include a first stage housing defining an annular flow channel between the outlets of the transition duct bodies and the first stage blade array, wherein the annular channel is free of flow turning vanes. Thus, the gas flow discharged from the outlet of each transition duct body can flow to the first stage blade array without passing any flow turning vanes.

The outlet region surrounding the outlet of each transition duct body can be at least partially supported by the first stage housing. Additionally, each transition duct body can be coupled to a discharge portion of a respective combustor. The first stage housing can include a blade ring surrounding the first stage blade array and each outlet region can be at least partially supported by the blade ring.

The outlets of the transition duct bodies are preferably spaced circumferentially to form an annular pattern. Also, the longitudinal face of each outlet is preferably substantially parallel to a plane of rotation of the first stage blade array.

The outlet regions can be supported by a support ring coupled to the first stage housing. The support ring can be made up of a plurality of support ring segments spaced circumferentially to define the support ring. Each support ring segment can have inner and outer spans joined by a central column defining a lateral opening on either side of the central column. A portion of one of the transition duct bodies can be inserted into the lateral opening, and two adjacent ring segments can be attached to a common one of the transition duct bodies so that the inserted portion of the common transition duct body is substantially surrounded and the junction of adjacent ring segments occurs along an imaginary line across the outlet of the common transition duct body. In this way, leakage between adjacent transition duct bodies can at least partially be prevented. Each support ring segment can include support legs extending from the outer span and connecting to the turbine section support housing. Further, the inner and outer spans and column can provide a sealing system along each lateral opening to seal against the inserted transition duct body portion.

BRIEF DESCRIPTION OF THE DRAWINGS

A detailed description of various possible embodiments incorporating aspects of the invention is set forth below, with reference to various figures of drawing, of which.

DETAILED DESCRIPTION OF EMBODIMENTS OF THE INVENTION

Embodiments according to aspects of the present invention are directed to combustion turbine transition ducts that impart a tangential component to the gas flow discharged from the transition duct in substitution of the corresponding tangential turning by a first stage vane. Thus, with the use of a transition duct according to aspects of the invention, first stage vanes in an associated turbine engine can be eliminated, avoiding various challenges attendant to use of first stage vanes. According to embodiments of the invention, the transition can be used in a turbine subsystem having a first stage blade array and one or more combustors located longitudinally upstream and radially outboard of the first stage blade array. This subsystem is used in a combustion turbine system having a compressor section, a combustion section and a turbine section with appropriate structure for air intake and turbine exhaust to drive a central rotor for various applications, including electric power generation. Transition ducts according to the invention and turbine subsystems including such transition ducts are not limited in application to, or by the details, of any particular turbine engine. Embodiments of the invention will be explained in the context of one possible system, but the detailed description is intended only as exemplary. Embodiments of aspects of the invention are shown in FIGS. 4-13, but the present invention is not limited to the illustrated structure or application.

Figure 4:
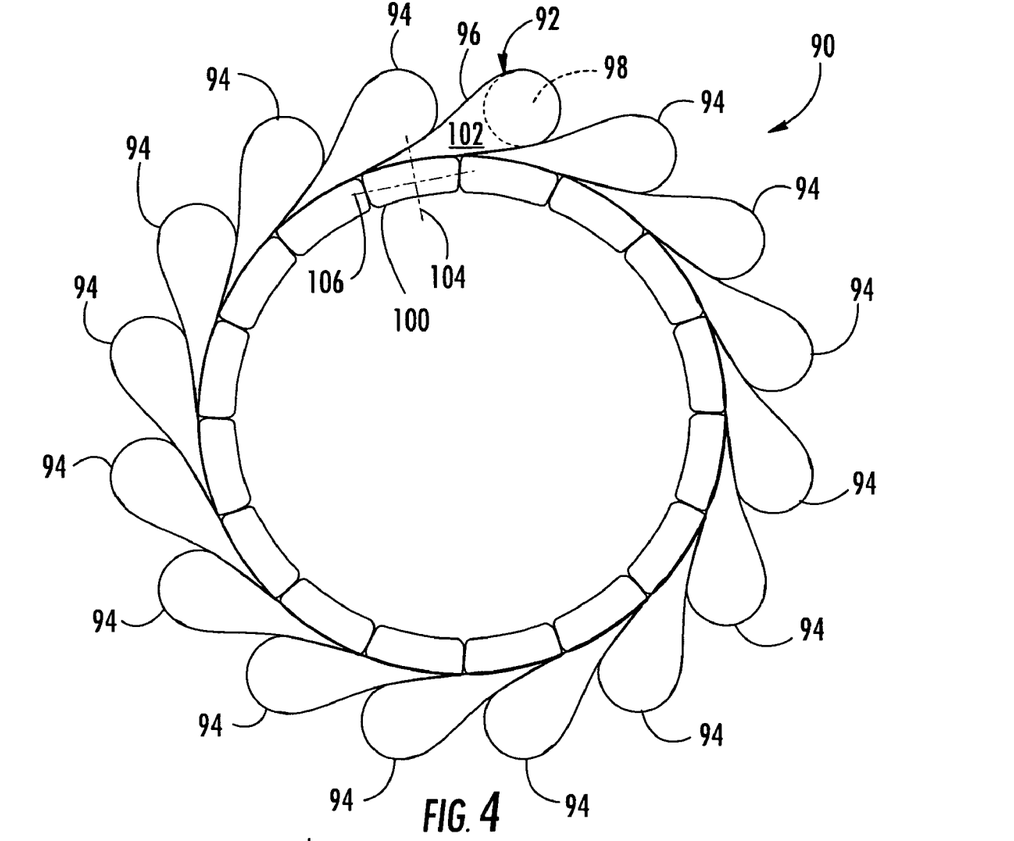
FIG. 4 is an upstream longitudinal view of a circular array of transition ducts embodying aspects of the invention.

Referring to FIG. 4, an annular array 90 of transition ducts 92, 94 according to aspects of the invention is shown without surrounding turbine components in an elevation as viewed from longitudinally downstream in a turbine. Each transition duct, such as transition duct 92, can include a transition body 96 having an inlet 98 and an outlet 100 and an internal passage 102 between the inlet 98 and the outlet 100 for routing a gas flow through the transition duct 92 from the inlet 98 to the outlet 100. The array 90 is shown illustrating an arrangement for use in a combustion turbine engine have 16 combustors (not shown). However, the number of transition ducts and their annular arrangement can be varied for use with more or less combustors.

Figure 5:
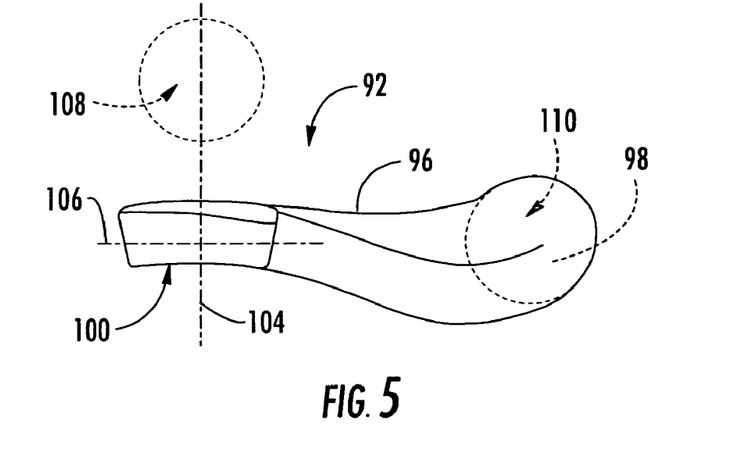
FIG. 5 is an upstream longitudinal view of one of the transition ducts shown in FIG. 4.

Referring particularly to the transition duct 92 as representative and to the transition duct 92 shown in FIG. 5, this transition duct 92 is shown in a possible operational arrangement as it would be positioned in a turbine engine (not shown). The outlet 100 is shown in a circumferential position corresponding approximately to the 12 o'clock position of the annular flow path in the turbine section, similar to the corresponding position of the outlet of the transition duct 38 shown in the prior turbine engine (see FIG. 1). The prior transition duct 54 shown in FIG. 2 is similarly positioned. However, unlike the prior transition duct 38, 54, in FIGS. 1 and 2, the outlet 100 in the transition duct body 96 of a transition duct 92 according to aspects of the invention is offset from the inlet 98 in all three coordinate directions—the longitudinal direction, the radial direction and the tangential direction, the latter two being represented by the axes 104, 106 respectively. The longitudinal axis is not shown because it is orthogonal to the axes 104, 106 and extends into and out of the page of the figures.

The term "offset" as used herein and in the claims means that the outlet is spaced from the inlet as measured along the coordinate direction(s) identified. For example, when the outlet is described as being tangentially offset from the inlet (or relative to the inlet), the outlet is spaced away from the inlet when measured in the tangential direction. Such spacing also means that the outlet and the inlet do not lie in a same plane orthogonal to the referenced direction or axis (which in this example is the tangential direction). Geometrically speaking, the inlet and outlet are not single points, but rather are two-dimensional areas. There is the possibility that the two areas may intersect or partially overlap such orthogonal plane depending on the extent of offset in any particular coordinate direction. Accordingly, the inlet and outlet are regarded as offset because the center point in the area defined by each of the inlet and outlet are not coplanar in a plane orthogonal to the referenced direction or axis.

With respect to the longitudinal offset, the transition duct 92 can be substituted in an existing turbine system and thus span the existing longitudinal distance between the longitudinally upstream combustor and the downstream entry to the first stage of the turbine section. The extent of longitudinal offset is not limited to existing turbine engine dimensions and can be any longitudinal length between the inlet 98 and the outlet 100. For example, if the inlet 98 is coupled to exhaust structure on a combustor, such as a head-on unit, liner or other exhaust framework, or if the inlet 98 is spaced from the combustor assembly but located to receive its exhaust, the longitudinal offset may be shorter. Also, the combustor may be inclined in the radial or circumferential direction, or both, resulting in a shorter or longer effective longitudinal spacing between the combustor and the first stage entry to a turbine section.

With respect to the radial offset, the various parts of the combustor assembly to which the inlet 98 can be coupled (or located near) and the radial positions and inclinations of these parts can affect the amount of radial offset between the inlet 98 and the outlet 100. However, because of the tangential offset discussed more fully below, the extent of radial offset can be less than the radial offset in prior transition ducts (compare FIG. 2 and FIG. 4). For the exemplary transition duct 92 shown in FIGS. 4 and 5, the extent of radial offset can be relatively small. Correspondingly, the radial bending thrust imparted on the transition duct body 92 by the turning gas flow within it can be correspondingly reduced.

It can be seen from the circumferential or tangential offset between the inlet 98 and the outlet 100 that the transition duct 92 would connected to a combustor (not shown) that is not circumferential aligned with the outlet 100. In FIG. 5, another combustor location 108 in an annular arrangement is shown schematically in phantom. The combustor location 108 is circumferential aligned with the outlet 100. If a prior transition duct as shown in FIG. 2 were used, its inlet would be positioned generally at the location 108. However, the inlet 98 of the transition duct 92 is positioned at combustor location 110 which could be, for example, one combustor position away in the circumferential direction. Depending on the particular longitudinal, radial and circumferential location of the combustors with respect to the entry of the first stage of the turbine section, the particular combustor to which a transition duct according to the invention is connected and its resulting outlet position can vary.

Figures 6, 7:
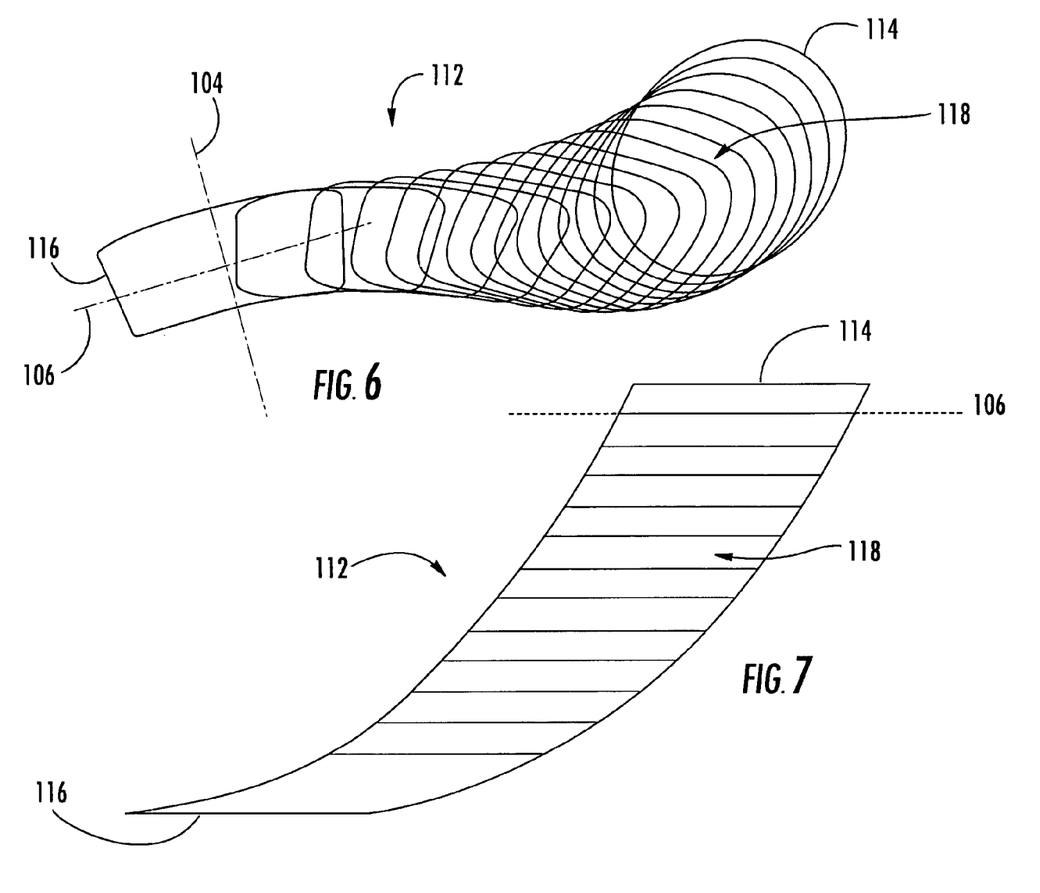
FIG. 6 is an upstream longitudinal view of a transition duct according to aspects of the invention, depicted in lengthwise stations.
FIG. 7 is a radial view of the transition duct shown in FIG. 6, depicted in lengthwise stations.

Referring to FIGS. 6 and 7, an exemplary transition duct 112 is shown in lengthwise stations, with each station depicting a cross sectional profile of the internal passage at that station. The inlet station 114 is shown as preferably round, and, in particular, elliptical. Other round profiles, such as circular, and other non-round profiles are also possible. The outlet station 116 is shown to be rectangular with the longer dimension in the circumferential direction denoted by the axis 106. The outlet 116 is preferably arcuate, that is, curved to generally correspond to the radius of curvature of the annular pattern formed by the spaced transition ducts (See FIG. 4). The outlet 116 can have other cross-sectional shapes. An outlet region of the transition duct body 112 surrounding and defining the outlet 116 can be elongated, rectangular, arcuate or all three, while the outlet has some other cross-sectional shape, such as circular or square, to name a few possibilities.

The internal passage 118 curves toward the outlet 116. The curvature, measured as a radius of curvature at any point, can change over the length of the internal passage 118 and some regions of the internal passage 118 can even be relatively straight. The curvature on the top, bottom and sides of the internal passage 118 can also vary or be the same with respect to each other. As shown by the stations, the cross-sectional profile of the internal passage 118 in the exemplary transition duct 112 changes from a preferably round profile at the inlet 114 to a preferably elongated, rectangular, arcuate profile at the outlet 116. The transition 112 can also include a reduction in the height of the internal passage 118 in the radial direction 104 from the inlet 114 toward the outlet 116. Additionally or alternatively, the width of the internal passage in the circumferential direction 106 can decrease from the inlet 114 toward the outlet 116 as best seen in FIG. 7.

The curvature of the internal passage 118 can include a decrease or complete discontinuance of radially inward curvature along the top and bottom before approaching the outlet 116. With this construction, the gas flow discharging from the outlet 116 will have little or no significant radial component to its direction of flow. Due to boundary conditions along the periphery of the outlet and edge conditions at the interface of the outlet with the first stage region of the turbine section, there may be incidental flow having a directional component in any or all of the longitudinal, radial and tangential directions. Such secondary flow should be considered de minimis because the general flow pattern, as measured particularly in the central region of the flow away from the edges, should be predominantly in a predetermined direction. Preferably, this general flow pattern has little or no radial component. The curvature of the transition duct 112 and the radially, longitudinally and tangentially offset of the outlet 116 relative to the inlet 114 results in a gas flow discharging from the outlet 116 at an angle in the tangential direction relative to the longitudinal direction.

While the internal passage 118 can have curvature features as described, the exterior surface of the transition duct body 112 need not necessarily follow the same curvature or shape profile. The exterior surface can have any of a number of shapes and surface features, for example, the exterior surface can be shaped to matingly fit with adjacent transition duct bodies and provide mounting surfaces for connecting to support braces and the like.

Figure 8:
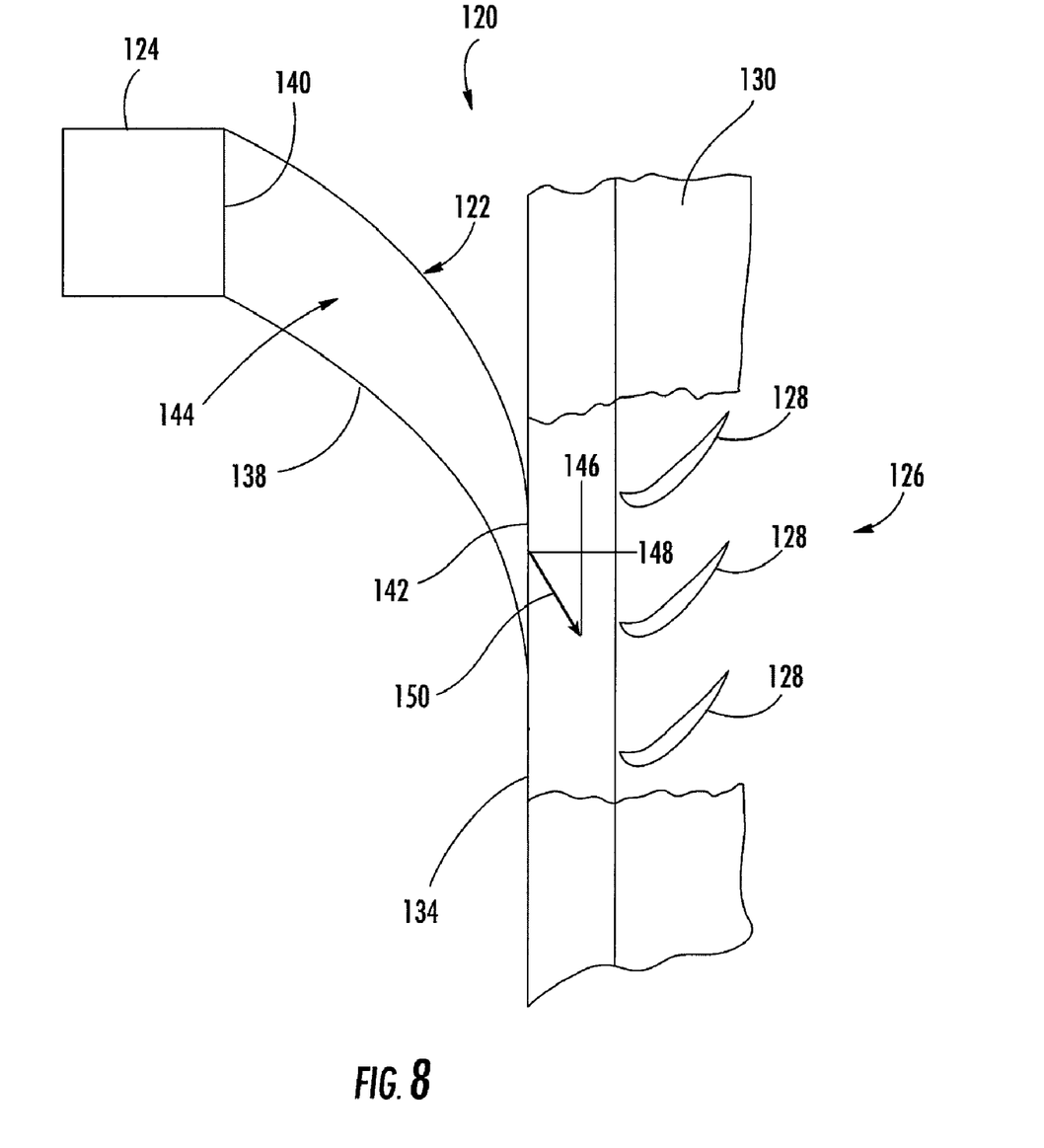
FIG. 8 is a schematic radial view of an embodiment of a combustor, a transition duct and first stage blades according to aspects of the invention.

Referring to FIG. 8, a schematic view from above of an exemplary turbine subsystem 120 using a transition duct 122 according to aspects of the invention is shown. The turbine subsystem 120 can include a combustor 124 and a first stage turbine blade array 126 located longitudinally downstream of the combustor 124. The combustor 124 is also shown radially outboard of the first stage turbine blade array 126 relative to a central axis of a rotor (not shown) to which the first stage turbine blade array 126 would be affixed through a rotor disc or the like. The first stage blade array includes a plurality of blades extending radially from the rotor assembly and spaced circumferentially to form a circular array. Only three such blades 128 are shown in FIG. 8 schematically for ease of illustration, but the array 126 would have additional blades. The turbine engine subsystem 120 can also include a first stage housing for enclosing the first stage blade array 126. The first stage housing can include a blade ring 130 which is shown schematically and partially broken away to reveal the blades 128 inside. The upstream side 134 of the blade ring 130 is preferably adapted to couple to the transition outlet 142. The spacing between the outlet 142 of the transition duct 122 and the leading edges of the blades 128 is preferably substantially the same as the distance between first stage vane trailing edges and the first stage blade leading edges used in prior systems. Alternatively, the spacing between the outlet 142 and the leading edges of the blades 128 can be longer or shorter than prior vane-blade spacings. The spacing depicted in FIG. 8 is not intended to be to scale and is in fact spaced greater than preferred spacing to facilitate illustration of the discharge flow 150, discussed more fully below.

The turbine engine subsystem 120 according to aspects of the invention includes the transition duct 122 located between the combustor 124 and the first stage blade array 126. The transition duct 122 includes a transition duct body 138 having an inlet 140 located to receive a gas flow exhausted from the combustor 124 and an outlet 142 to discharge a gas flow toward the first stage blade array 126 with an internal passage 144 therebetween, as previously described. Only a single transition duct 122 is shown schematically in FIG. 8, but it should be understood that the turbine engine subsystem 120 can have multiple transition ducts, each corresponding to a combustor in a turbine engine. The inlet 140 can be coupled to the combustor assembly or support structure associated with the combustor, such as a combustor liner (not shown). Alternatively, the transition duct 122 can be attached to the framework of the combustion chamber, such as the combustion shell (not shown), and spaced from the combustor 124 but located to receive the combustion exhaust gas flow into the inlet 140.

The outlet 142 is offset from the inlet 140 in the three coordinate directions—longitudinally, radially and tangentially. The internal passage 144 is curved between the inlet 140 and outlet 142 at least along a portion of its length. An outlet region of the transition duct body 138 surrounds and defines the outlet 142 and can be coupled to the first stage housing, such as the blade ring 130. Alternatively, the outlet region can be coupled to and supported by other support structure within the combustion chamber, and the outlet 142 can be spaced from the blade ring 130 but located to discharge the gas flow into the first stage blade array 126.

The gas flow discharged from the outlet 142 is angled in the tangential direction 146 relative to the longitudinal direction 148 as depicted by the arrow 150. This gas flow direction 150 signifies the predominant flow direction of the gas flow, particularly in its relatively uniform central region away from the structural sides and edges. It can be seen that this gas flow direction 150 has a longitudinal component and a tangential component. As discussed above, there may be a slight radial component (into or out of the page of the figure), but preferably this radial component is minimized or eliminated by relative placement of the subsystem components and the curvature of the internal passage 144.

Because the gas flow discharges from the transition duct outlet 142 at an angle 150 in the tangential direction, first stage vanes can be eliminated. The complexity and costs of first stage vanes and their associated structural supports and cooling systems can likewise be avoided. Instead, the outlet 142 of the transition duct 122 can be offset longitudinally, radially and tangentially from the inlet 140 with a curved internal passage 144 therebetween to turn the gas flow to a discharge angle 150 appropriate for direct routing to the first stage blade array 128. The discharge angle 150 is preferably in the range of about 40 degrees to about 85 degrees.

A transition duct according to aspects of the invention turns the gas flow from the combustor to the first stage of the turbine section most significantly in the tangential direction, with relatively small turning in the radial direction and in the longitudinal direction. As a result, the thrust loads imparted on the transition duct can be higher in the tangential direction and lower in the radial and longitudinal direction. Also, because the transition duct according to aspects of the invention performs the turning function previously performed by first stage vanes, the mechanical and heat loads can be high. Accordingly, the transition duct is preferably made from materials that exhibit high strength properties in high temperature conditions. The transition duct can thus be made at least partially of CMC materials. Further, known cooling techniques, such as impingement cooling, effusion cooling, steam cooling and forced convection cooling, can be used.

Bearing support can be provided at the outlet region and inlet region of the transition duct. The inlet region can be secured to the combustor assembly or associated support structure, such as a combustor liner, as in the past. The outlet region is preferably supported by a braced ring support as discussed more fully below. Additionally, the transition duct array (see FIG. 4) can be supported between adjacent transition ducts by baffles, struts and the like or by additional ring supports that are braced to the surrounding support structure, such as the combustion chamber shell or a framework extending therefrom.

Figure 9:
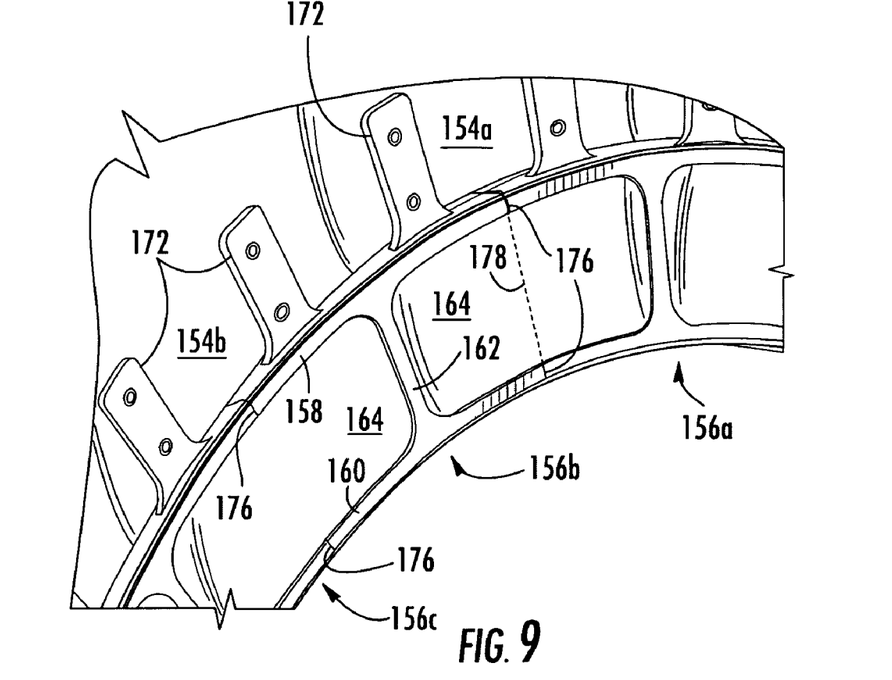
FIG. 9 is an upstream perspective view of an embodiment of a transition exit support system according to aspects of the invention.
Figure 10:
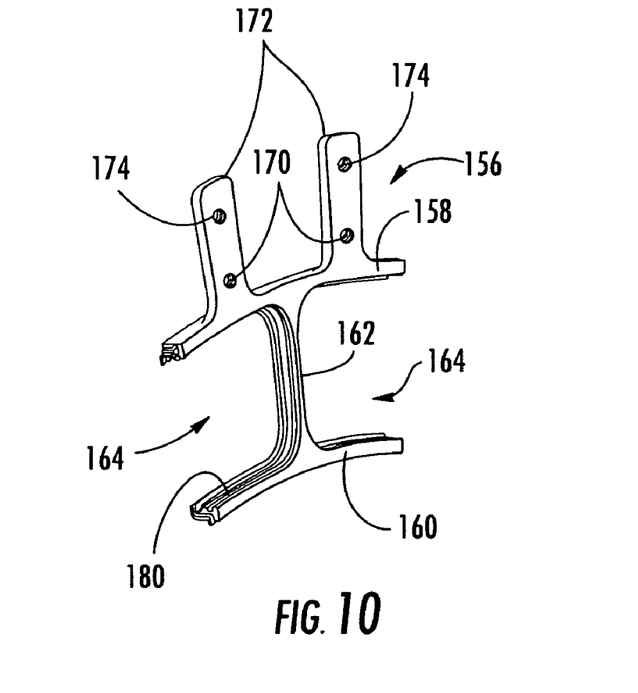
FIG. 10 is a downstream perspective view of an embodiment of a support ring segment for the transition exit support system embodiment shown in FIG. 9.
Figure 11:
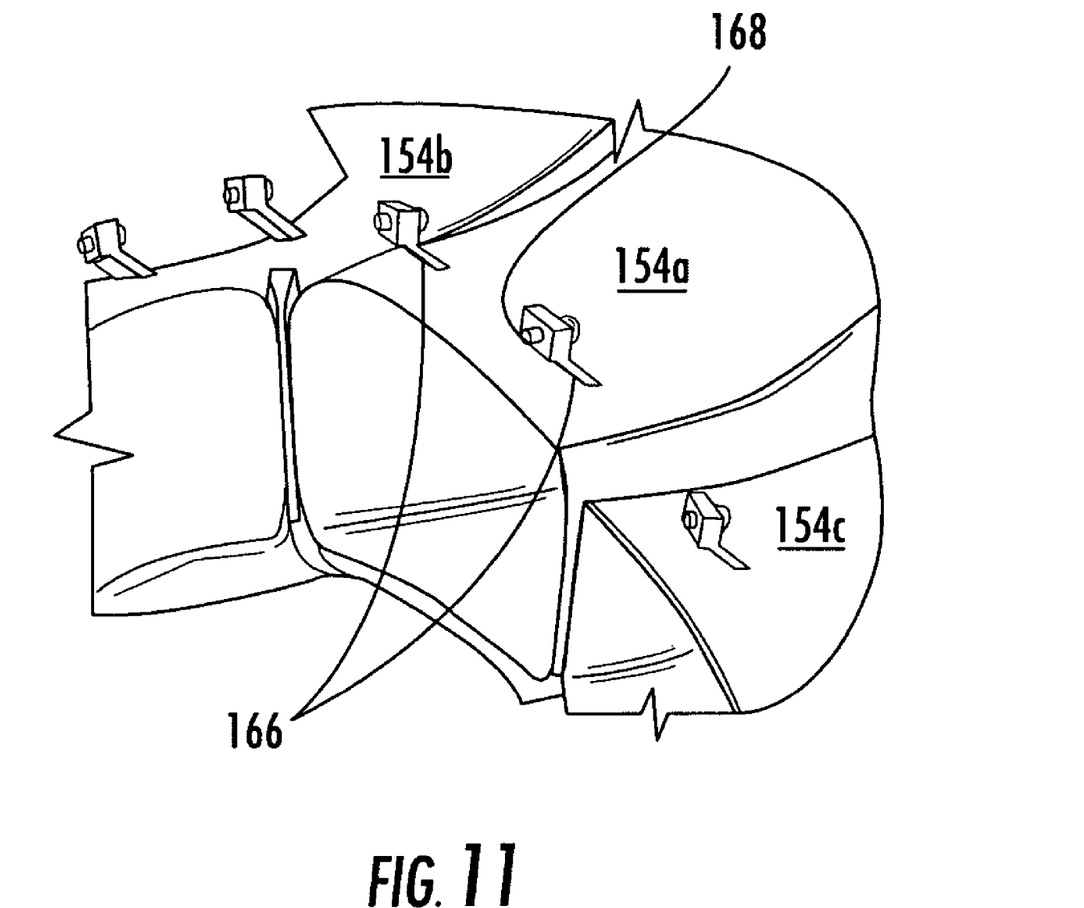
FIG. 11 is an upstream perspective view of a portion of a transition array equipped with support ring fasteners according to aspects of the invention.

Referring to FIGS. 9-11, the outlet region 154a, 154b, 154c of each transition duct can be supported by ring segments 156a, 156b, 156c that are spaced in a circular fashion to collectively form a support ring. Each support ring segment 156 can have an outer span 158 and an inner span 160, which are preferably arcuate, but can be straight. The spans 158, 160 are joined by a central column 162 defining a lateral opening 164 on either side of the central column 162 into which a portion of one of the transition duct bodies is inserted. Two adjacent ring segments 156a, 156b enclose a common transition duct body 154a so that the inserted portion of the common transition duct body 154a is substantially surrounded.

The outlet region 154a, 154b, 154c of each transition duct body can be equipped with fastener posts 166 that provide adjustable fasteners, such as threaded bolt 168, for mounting in corresponding apertures 170 in the ring segment 156. The apertures 170 are preferably provided on support legs, like braces 172, that extend out of one of the spans, preferably the outer span 158. The braces 172 can provide additional apertures 174 or other mounting structure for coupling to surrounding support structure, such as a blade ring or other the first stage housing of the turbine section (not shown). Braces 172 can extend radially outwardly to couple to radially outer structure of the first stage housing. Braces can additionally or alternatively extend radially inwardly from the inner spans to affix to radially inward support structure of the first stage housing. The braces 172 or other support legs are preferably dimensioned and constructed of high strength material to provide bearing support to primarily circumferential loads.

The use of ring segments can also assist in reducing longitudinal leakage in the spacing between adjacent transition ducts. As shown in FIG. 9, the junctions 176 of adjacent ring segments such as segments 156b and 156c occur along an imaginary line 178 across the outlet of the common transition duct body 154b, whereby leakage between adjacent transition duct bodies is at least partially prevented. Any spacing in a junction 176 can be sealed by appropriate bridging material. Further, as shown in FIG. 10, the spans 158, 160 and the column 162 of the ring segment 156 can provide a rope seal 180 along each lateral opening 164 to seal against the inserted transition duct body portion. Preferably, two such rope seals are used, but one, three or more are also possible.

Thus, the invention provides a combustor transition duct that not only routes gas flow from a combustor to a first stage section of a turbine system, but also turns the gas flow in the tangential direction relative to the longitudinal direction for direct presentation to a first stage blade array, thereby eliminating the need for a first stage vane row.

The foregoing description is provided in the context of a few possible constructions of such a transition duct and associated turbine subsystem. Thus, it will of course be understood that the invention is not limited to the specific details described herein, which are given by way of example only, and that various modifications and alterations are possible within the scope of the invention as defined in the following claims.

What is claimed is:

1. A combustion turbine subsystem, comprising:
    a first stage blade array having a plurality of blades extending in a radial direction from a rotor assembly for rotation in a circumferential direction about an axis of the rotor assembly, said axis of the rotor assembly defining an longitudinal direction and said circumferential direction including a tangential direction component;
    a plurality of combustors located longitudinally upstream of the first stage blade array, each of said combustors being located radially outboard of the first stage blade array; each combustor exhausting a gas flow in a direction having at least a longitudinally downstream component;
    a plurality of transition duct bodies, each having an internal passage extending between an inlet and an outlet, wherein the outlet of each transition duct body is circumferentially aligned with the inlet of an adjacent one of the transition duct bodies, each transition duct body being located between a respective combustor and the first stage blade away to receive the gas flow exhausted by the respective combustor into the internal passage through the inlet, said outlet discharging said gas flow from the internal passage toward said first stage blade array, wherein the outlet is longitudinally, tangentially and radially offset from the inlet and the internal passage is curved toward the offset outlet so that the gas flow discharges from the outlet at a discharge angle between the longitudinal direction and the tangential direction, the internal passage of each duct being free of vanes; and
    a first stage housing defining an annular flow channel between the outlets of the transition duct bodies and the first stage blade array, wherein the annular channel is free of flow turning vanes, whereby the gas flow discharged from the outlet of each transition duct body flows to the first stage blade array without passing any flow turning vanes.

2. The combustion turbine subsystem of claim 1, wherein the outlet of each transition duct body is elongated in the tangential direction.

3. The combustion turbine subsystem of claim 2, wherein each outlet is generally rectangular in the tangential direction.

4. The combustion turbine subsystem of claim 3, wherein each outlet is arcuate in the tangential direction.

5. The combustion turbine subsystem of claim 2, wherein each inlet is generally round and each internal passage transitions from a generally round cross-sectional profile at the inlet to a generally tangentially elongated cross-sectional profile at the outlet.

6. The combustion turbine subsystem of claim 1, wherein the height of the internal passage in the radial direction decreases from the inlet toward the outlet.

7. The combustion turbine subsystem of claim 1, where at least one of the transition ducts is made at least partially from CMC ceramic.

8. The combustion turbine subsystem of claim 1, wherein the gas flow discharged from the outlet in a tangential direction that forms a discharge angle between about 40 degrees and about 85 degrees relative to the longitudinal direction.

9. The combustion turbine subsystem of claim 8, wherein the gas flow discharges from the outlet substantially in a plane defined by the longitudinal direction and the tangential direction, whereby the discharged gas flow direction has little or no radial component.

10. The combustion turbine subsystem of claim 1, wherein each transition duct body has an outlet region surrounding the outlet of the transition duct body, each said outlet region being at least partially supported by the first stage housing.

11. The combustion turbine subsystem of claim 10, wherein each transition duct body is coupled to a discharge portion of a respective combustor.

12. The combustion turbine subsystem of claim 10, wherein the first stage housing includes a blade ring surrounding the first stage blade array and each outlet region is at least partially supported by the blade ring.

13. The combustion turbine subsystem of claim 1, wherein the outlets of the transition duct bodies are spaced circumferentially to form an annular pattern.

14. The combustion turbine subsystem of claim 13, wherein a longitudinal face of each outlet is substantially parallel to a plane of rotation of the first stage blade array.

15. The combustion turbine subsystem of claim 13, further comprising a first stage housing defining an annular flow channel between the outlets of the transition duct bodies and the first stage blade array, wherein each transition duct body has an outlet region surrounding the outlet of the transition duct body, each outlet region being supported by a support ring coupled to the first stage housing.

16. The combustion turbine subsystem of claim 1, wherein the internal passage includes substantially no radially inward curvature before approaching the outlet.

17. The combustion turbine subsystem of claim 1, wherein the width of the internal passage in the tangential direction decreases from the inlet toward the outlet.

18. A transition duct system for routing a gas flow in a combustion turbine subsystem that includes a first stage blade array having a plurality of blades extending in a radial direction from a rotor assembly for rotation in a circumferential direction about an axis of the rotor assembly, said axis of the rotor assembly defining an longitudinal direction and said circumferential direction including a tangential direction component, and a plurality of combustors located longitudinally upstream of the first stage blade array and located radially outboard of the first stage blade array, each combustor exhausting a gas flow in a direction having at least a longitudinally downstream component, said combustion turbine subsystem comprising:

a plurality of transition duct bodies, each having an internal passage extending between an inlet and an outlet, wherein the outlet of each transition duct body is circumferentially aligned with the inlet of an adjacent one of the transition duct bodies, each transition duct body being located between a respective combustor and a first stage blade away to receive the gas flow exhausted by the respective combustor into the internal passage through the inlet, said outlet discharging said gas flow from the internal passage toward said first stage blade array, wherein the outlet is longitudinally, tangentially and radially offset from the inlet and the internal passage is curved toward the offset outlet so that the gas flow discharges from the outlet at a discharge angle between the longitudinal direction and the tangential direction, the internal passage of each duct being free of vanes; and a generally annular flow channel between the outlets of the transition duct bodies and the first stage blade array, wherein the annular flow channel is free of flow turning vanes, whereby the gas flow discharged from the outlet of each transition duct body flows to the first stage blade away without passing any flow turning vanes.

* * * * *